Dec. 18, 1956     C. ORLANDO     2,774,961

MOVING OBJECT INDICATOR

Filed Aug. 30, 1954

*INVENTOR.*
CARL ORLANDO

BY

*Harry M. Saragovitz*

ATTORNEY

United States Patent Office 2,774,961
Patented Dec. 18, 1956

2,774,961
MOVING OBJECT INDICATOR

Carl Orlando, Long Branch, N. J., assignor to the United States of America as represented by the Secretary of the Army Application August 30, 1954, Serial No. 453,168

4 Claims. (Cl. 340—258)

(Granted under Title 35, U. S. Code (1952), sec. 266)

The invention described herein may be manufactured and used by or for the Government for governmental purposes without the payment of any royalty thereon.

This invention relates to moving object indicators and particularly to such indicators which employ radiant energy as the sensing medium and which function through optical means to activate an indicating alarm signal or other device.

The invention is simple in construction and effective in operation as compared to other types of apparatus which indicate the motion of an object within a selected field of view.

The essential elements of the apparatus include one or more optical density wedges having any desired, but preferably, substantially continuous density gradations. The use of two such wedges provides an efficient form for the invention. Suitable means is provided to direct the image of a section of terrain or sky, which may be the subject of surveillance, upon the respective wedges. To accomplish this result separate lenses may be used, or a single lens and a beam splitter may serve the purpose. In the latter case each portion of the split beam would be directed upon the respective wedges. Photo-sensitive means, such as photo-electric cells are in position with respect to each wedge to receive light which has been transmitted through the wedges. When two wedges are used they are preferably arranged to present oppositely varying densities to the shift in light distribution caused by the movement of an object within the surveyed field of view.

The photo-cells are connected in a bridge circuit where normally a balanced circuit condition is maintained during those periods when there is no movement of objects in the surveyed area. When an object moves, however, the light pattern changes which causes the cells to produce an unbalanced condition at the bridge. This unbalanced potential at the bridge becomes available to activate or control an alarm or to perform other desired functions.

It is a primary object of the invention to provide a moving object indicating device which is highly portable and can be used for example at extreme outpost positions in military operations.

A further object of the invention is to provide a moving object indicator which is simple and rugged in construction and which is highly resistant to climatic conditions.

Other objects and features of the invention will more fully appear from the following description and will be particularly pointed out in the claims.

To provide a better understanding of the invention a particular embodiment thereof will be described and illustrated in the accompanying drawings wherein—

The embodiment of the invention to be described is particularly useful in automatically detecting the presence of a moving object within a given field of view and may be constructed in the form of a compact lightweight highly portable unit. For purposes of illustration, however, it is not considered necessary to describe the supporting structural details for the apparatus. Any suitable structure may be adopted to fulfill the requirements of a desired application.

The apparatus is shown diagrammatically and is provided with a pair of lenses 5 and 6 which focus an image of the same section of sky or terrain respectively upon a pair of optical density wedges 7 and 8, preferably of the same or similar density range. As shown, the wedges are arranged to present oppositely varying densities to a shift in light distribution incident thereon. The change in light distribution may be caused by motion of an object within the field. Other arrangements of the wedges may be used in the practice of the invention as will be pointed out hereinafter. Desirably, the wedges occupy substantially the full format area of the lenses.

On the side of the wedges opposite to that of the lenses are secured a pair of light sensitive devices preferably of the electronic photo-sensitive type which receive light transmitted through the wedges. Desirably, but not necessarily, a pair of light concentrating lenses 9 and 10 are interposed between the wedges and the photo-sensitive means. By concentrating the light in this manner the response of the sensitive means to a change in light energy is increased. There are several types of photo-sensitive devices which may be used such as photo-cells 11 and 12, or photo-multiplier tubes may be used either with or without amplification. Thus, sensitivity of the light responsive device may be very high.

Figure 2:
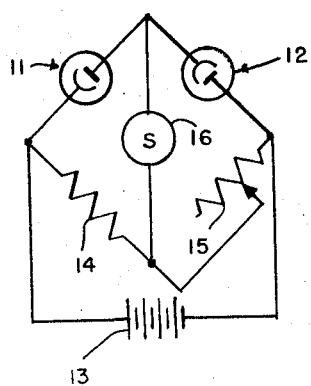
Fig. 2 illustrates an electrical bridge circuit suitable for activating an alarm for responding to the sensing means of the apparatus illustrated in Fig. 1.

To utilize the output of the photo-cells 11 and 12 to best advantage for activating an alarm or other device, various means such as electronic circuits may be utilized. An effective utilization circuit is illustrated in Fig. 2 of the drawings and consists of a conventional bridge circuit powered by a battery 13 or other suitable source. Photo-cells 11 and 12 are connected in two adjacent legs of the bridge, while the other two legs of the bridge have connected therein balanced impedances 14 and 15. One of these impedances, for example, the impedance 15 is made adjustable. An alarm device 16 is connected between the null points of the bridge, which are in the present instance, at the points of junction of the cells 11 and 12 and the points of junction between the impedances 14 and 15. Desirably, the cathode of one of the cells is connected to the plate of the other cell while the remaining terminals of the cells are connected to the outer terminals of the impedance and to the battery 13 respectively.

When the bridge is properly balanced no voltage will be applied to the alarm device 16, and a stable condition will exist. When the bridge becomes unbalanced a voltage becomes available across the null points of the bridge which is utilized for controlling the alarm.

Figure 1:
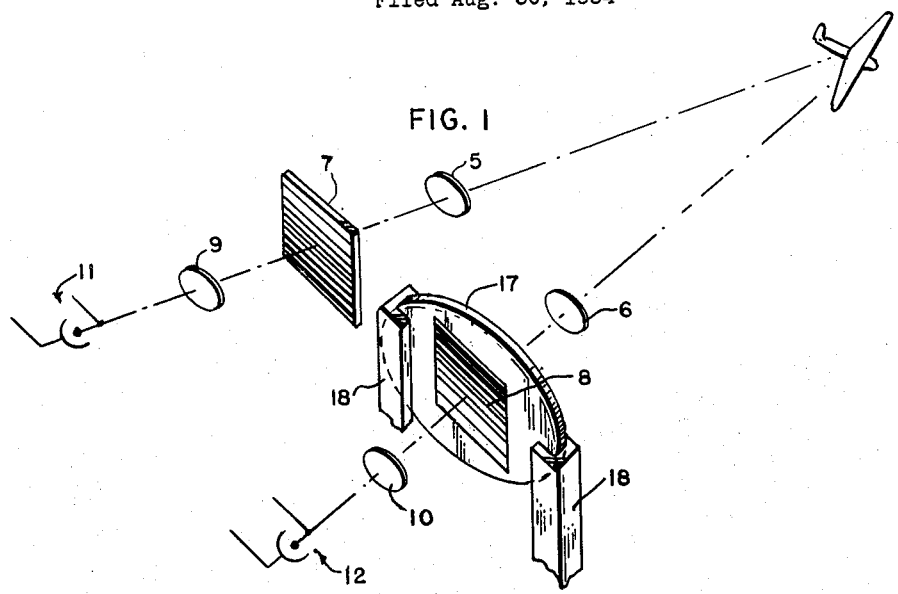
Fig. 1 is a diagrammatic illustration of a preferred form of the invention.

In the operation of the device when no movement occurs within the field of view, a fixed and stable quantity of light reaches the photo-cells 11 and 12. Since the light reaching the cells has passed through the density wedges the quantity of light reaching the respective photo-cells is regulated thereby. In most circumstances a slightly different quantity of light will be transmitted by the respective wedges. This is due to the condition that the pattern of light presented by the image from the lenses has a distribution which varies throughout its area, and since the wedges are so positioned that they vary in density gradation, and as illustrated in Fig. 1 the gradations of the separate wedges are reversed in density. It will be apparent, therefore, that light transmitted by one of the wedges will differ from the light transmitted by the other, with the possible exception of when the area being surveyed has an even distribution of light such as in the case of a clear sky.

If an unequal quantity of light is transmitted by the wedges when no movement occurs within the field of view, the bridge circuit may be balanced by varying the adjustable impedance 15 until a zero potential is obtained at the null point of the bridge. Thus, no alarm is sounded unless and until a redistribution of the light pattern within the field of view is caused by the movement of an object within the field or by an object which enters the field. When such movement occurs the bridge circuit becomes unbalanced which makes available a potential used to control an alarm device.

When an object moves within the field, a light or dark area, depending upon the reflectivity of the object will move into an area of different density on each of the density wedges. Assuming the object has a relatively high reflectivity and its image moves to a position of high density in one of the wedges, less light will reach its particular photo-cell. With respect to the wedge in the arrangement shown in Fig. 1, movement of the image of the object will be to a lower density area, in which case more light will reach the photo-cell which is associated with that particular wedge.

It will be apparent, therefore, that if the polarity of the photo-cells is correctly maintained, the voltage changes in each cell will be added with the result that a substantial potential becomes available in the alarm device when an object within the field moves.

Any suitable alarm device may be used, such as a flashing light, an audible signal such as a horn or a bell, and moreover, several signalling units may be located at strategic points either close by the apparatus or at remote points. The voltage which becomes available when the bridge is unbalanced may be used for many different purposes besides that of sounding an alarm, such as the actuation of a mechanical apparatus through a servo system or other means.

The efficiency and usefulness of the invention may be extended by providing for rotation of the wedges 7 and 8 about an axis perpendicular to their plane. By so doing, it is possible to increase the overall sensitivity of the apparatus as follows: In the event that the general direction of movement of an object can be anticipated, the wedges may be so oriented that the shift in the light pattern caused by movement of an object will cause a maximum change in light energy incident upon the photo-cells.

The means for permitting rotation of the wedges may be of any suitable construction, such as that indicated schematically in Fig. 1 wherein the wedges are mounted in a circular holding device 16, which in turn is supported in a rigid structure 18, composed of one or more elements having circular slots therein, complementary to the curvature of the holders 16. When so mounted, the wedges may be manually rotated to the desired angle while remaining upon the optical axis of the apparatus.

In connection with the adjustment of the wedges, such adjustment may be utilized to adapt the apparatus to various requirements. It may be desirable to position the wedges at right angles to each other, in which case vertical movement of an object within the field will cause a major light shift through the vertically positioned wedge while horizontal movement of the object will cause a major light shift through the horizontally positioned wedge. Other combinations for the disposition of the wedges will become obvious.

Figure 3:
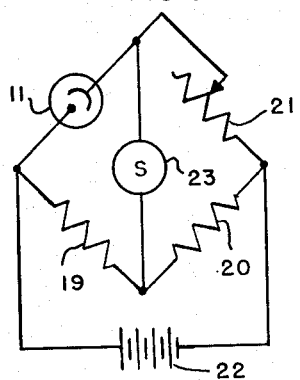
Fig. 3 illustrates a form of electric bridge circuit for activating an alarm in connection with the moving object indicator using only one density wedge.

The invention may be practiced in other ways than that described above. For example, within the major concept of the invention a simplified construction may be used wherein only one wedge and one photo-sensitive unit are used. In such construction the lens 5, the wedge 7, the lens 9 and the photo-cell 11 are arranged as shown in Fig. 1. The cell 11, however, is connected in a bridge circuit such as that shown in Fig. 3, wherein the cell is connected in one leg of the bridge while the other legs embrace balanced impedances 19, 20 and 21, one or more of which are variable, for example, the impedance 21 is shown as a variable unit. The impedances 19 and 20 in the other legs of the bridge are of matched value. Energy is fed to the bridge by a battery 22 or other suitable source, the terminals of which are connected respectively to the junction of the cell 11 and impedance 19, and to the junction of impedances 20 and 21. The alarm device 23 is connected at the null points of the bridge between the junction of the cell and the impedance 21, and the junction of the imepdances 19 and 20.

In this form of the apparatus a stable no alarm condition is achieved by adjusting the impedance 21. When an object moves within the field a change in light disposition upon the wedge 7 occurs which unbalances the bridge and makes available a potential to control an alarm or other device.

Figure 4:
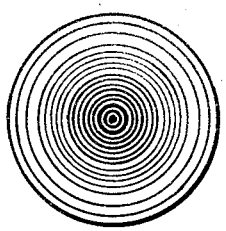
Fig. 4 illustrates a density wedge of different structure from that illustrated in the other figures.

In the forms of the invention above described, the density wedges employed have been of the type wherein the scale of density has been linear. It is possible, however, to use other types of wedges, for instance, the circular density scale wedge such as that shown in Fig. 4 may be used to good advantage either in the single wedge type or the double wedge form of the invention. In the circular type of wedge the center may be either of maximum or minimum density and the density may vary in circular zones either in increasing or decreasing increments toward the periphery of the wedge. This type of wedge needs no orientation and is particularly useful when the anticipated motion of an object is substantially diametrically across the field.

It should be noted that the invention possesses a particularly valuable attribute in that it will function automatically and unattended to survey a wide area for the detection of moving objects. The density wedge or wedges may have sufficient area to cover the whole angle of view of the lens in which case the total area viewed by the lens is constantly under surveillance.

What is claimed is:

1. A moving object indicator comprising a lens system directable toward an area to be surveyed, a pair of light controlling density wedges each having a linear scale of values said wedges being positioned with their scales at 180° to each other and in position to transmit portions of the light from said lens system, separate photo-electric means for integrating the light transmitted by each wedge, alarm means connected to and controlled by said photo-electric means and nullifying means for canceling the difference in output of said photo-electric means when no change in light energy distribution incident on said wedges takes place whereby when a change in light energy occurs the alarm will be sounded.

2. A moving target indicator comprising a lens system directable toward an area to be surveyed, a pair of light controlling density wedges having a linear scale of values said wedges being positioned with their scales at substantially 90° to each other and in position to transmit light from said lens system, separate photo-electric means for integrating the light transmitted through each of said wedges, alarm means connected to and controlled by said photo-electric means and nullifying means for canceling the difference in output of said photo-electric means when no change in light energy disposition reaching said wedges occurs whereby when a change in light occurs the difference in the potentials of photo-electric means become available to control said alarm.

3. A moving object indicator comprising the elements defined in claim 1 and wherein the said photo-electric means are connected respectively in two of the legs of a Wheatstone bridge circuit.

4. A moving object indicator apparatus having the elements defined in claim 1 together with means for permitting the wedges to be rotated upon an axis perpendicular to their plane.

References Cited in the file of this patent

UNITED STATES PATENTS

| | | |
|---|---|---|
| 1,820,357 | Lindstrom et al. | Aug. 25, 1931 |
| 2,506,946 | Walker | May 9, 1950 |
| 2,700,318 | Snyder | Jan. 25, 1955 |

FOREIGN PATENTS

| | | |
|---|---|---|
| 474,090 | Canada | May 29, 1951 |